United States Patent [19]

Bainard

[11] 4,026,563

[45] May 31, 1977

[54] OIL SEAL WITH LOCKING BEAD AND O. D. SEALING RIB

[75] Inventor: Dean R. Bainard, Bethel Township, S.C.

[73] Assignee: Garlock Inc, Rochester, N.Y.

[22] Filed: Mar. 23, 1976

[21] Appl. No.: 669,668

[52] U.S. Cl. .................................. 277/1; 277/37; 277/181

[51] Int. Cl.² ........................................ F16J 15/32

[58] Field of Search ............... 277/37, 39, 181–186, 277/164, 168–172

[56] References Cited

UNITED STATES PATENTS 2,834,616  5/1958  Gebert et al. ..................... 277/37

3,866,925  2/1975  Maimstrom ..................... 277/164

*Primary Examiner*—Robert I. Smith
*Attorney, Agent, or Firm*—Schovee & Boston

[57] ABSTRACT

An oil seal and the combination of a housing bore with the oil seal, the oil seal including an annular locking bead and annular O.D. sealing ribs, for use in applications where a minimum of radial force may be exerted by the seal on the bore and where the oil seal must be positively retained in the bore. The O.D. sealing ribs provide sufficient interference fit with the bore to effect a seal, but insufficient to retain the oil seal in the bore. The locking bead positively retains the oil seal in the bore.

5 Claims, 1 Drawing Figure

U.S. Patent        May 31, 1977        4,026,563
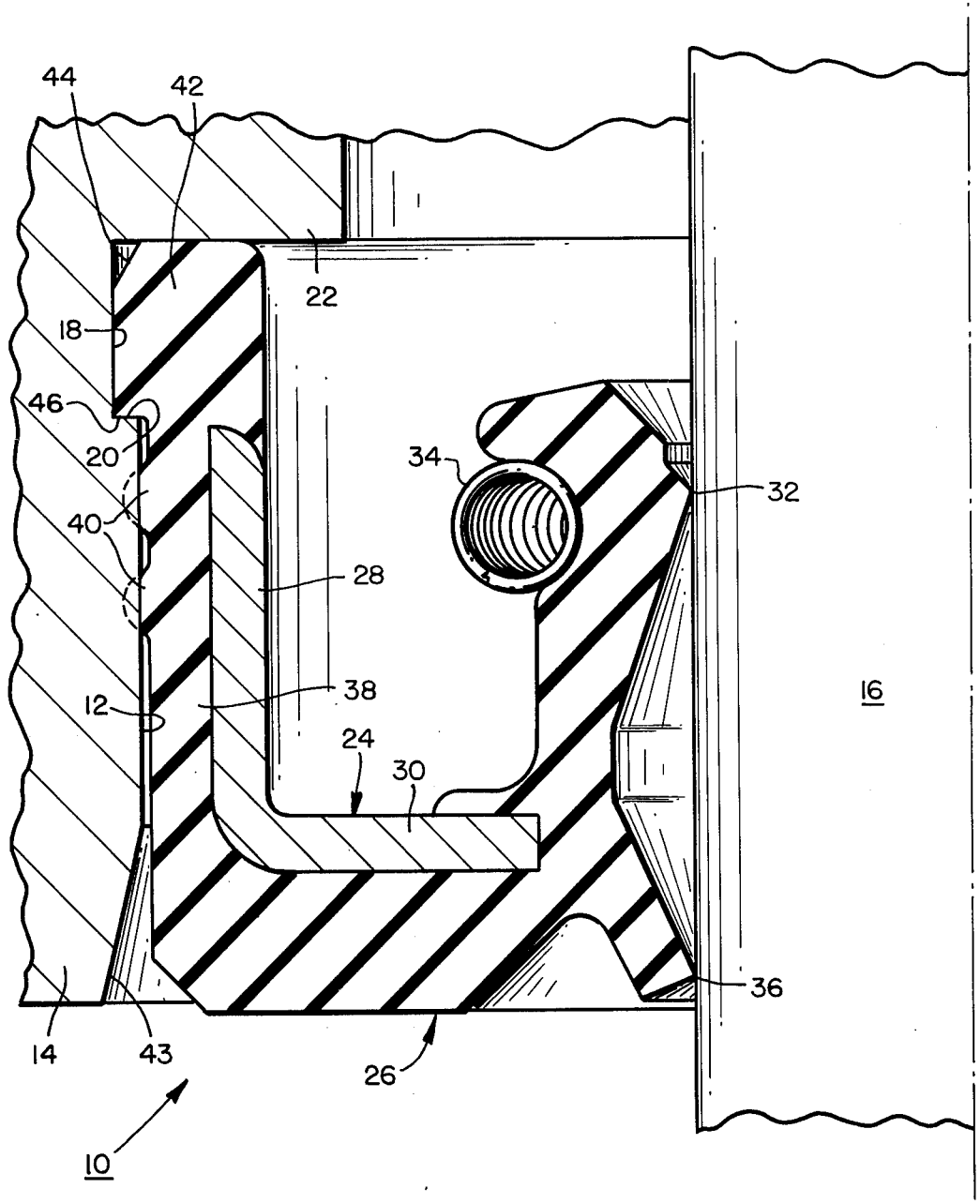

OIL SEAL WITH LOCKING BEAD AND O. D. SEALING RIB

BACKGROUND OF THE INVENTION

1. Field of the Invention

This invention relates to oil seals and in particular to oil seals for use in applications where a minimum radial force may be exerted on the bore and where the oil seal must be positively retained in the bore.

2. Description of the Prior Art

Prior art seals are known for use in applications such as rear crank shaft seals but have not been completely successful because their use results in leakage through the split area in spreading of the bearing cap-to-block interface which can cause a shortened bearing life; in some cases the prior art oil seals are subject to both of these disadvantages.

While O.D. sealing ribs are known (see U.S. Pat. No. 3,356,376), they are used with such an interference fit as to make the seal self-retaining in the bore, by exerting considerable force radially outwardly against the bore. Also, while locking beads are known per se (see U.S. Pat. Nos. 2,275,325, 2,857,179, 3,014,768, and 3,162,456), it is not known that the combination of the two, as in the present invention, will allow the O.D. sealing ribs to be designed with a reduction in the O.D. press-fit (force), while still maintaining an O.D. seal.

SUMMARY OF THE PRESENT INVENTION

An oil seal, and the combination therewith of a housing and bore with an annular, undercut locking groove having a locking face at the axially outer end of the groove. The oil seal includes an annular shell having a cylindrical section and an inner flange extending radially inwardly from the cylindrical section, and an elastomeric sealing element bonded to the shell and having a sealing lip, at least one sealing rib (and preferably two or more) bonded to the O.D. of the cylindrical section and a locking bead bonded to the cylindrical section and extending axially inwardly beyond the axially inner end of the cylindrical section and having an O.D. greater than the O.D. of the sealing rib(s). The locking bead has a locking shoulder with a substantially transverse face at the axially outer end thereof which abuts against the locking face of the locking groove, to positively retain the oil seal in the housing bore. The locking bead also has a chamfered edge between the O.D. and the axially inner radial face of the locking bead to aid in inserting the oil seal into the housing bore. The radial force exerted outwardly against the bore by the locking bead during seal installation can be predetermined and adjusted by proper design of the relationship between the axially inner end of the cylindrical section of the shell and the locking bead. That is, the more that the locking bead is backed up by the shell, the higher are the forces involved during installation. The annular sealing rib(s) provides a sufficient interference fit to effect a seal, but provides an insufficient press fit to positively retain the oil seal in the bore. Preferably, the sealing rib(s) provides a nominal press fit less than approximately one-half of the "normal" press fit required for an elastomeric O.D. seal.

BRIEF DESCRIPTION OF THE DRAWING

The present invention will be more fully understood by reference to the following detailed description thereof, when read in conjunction with the attached drawing wherein:

The FIGURE is a partial cross-sectional view of the seal of the present invention shown installed between a housing bore and a shaft.

DETAILED DESCRIPTION OF THE PREFERRED EMBODIMENT

With reference now to the drawing, the FIGURE shows an oil seal 10 according to the present invention installed between a bore 12 of a housing 14 and a shaft 16. The bore 12 includes an annular undercut locking groove 18 having a locking face 20 at the axially outer end of the groove 18. In the particular embodiment shown in the FIGURE the bore 12 is a counter-bore in the housing and includes a bore face 22.

The oil seal 10 includes an annular metal reinforcing shell 24 and an elastomeric sealing element 26 bonded to the shell 24. The shell 24 includes a cylindrical section 28 and an inner flange 30 extending radially inwardly from the axially outer end of the cylindrical section 28. It is to be noted that the shell 24 can have other shapes, for example, the cylindrical section need not be exactly cylindrical and the inner flange need not be exactly radial and need not extend inwardly from the axially outer end of the cylindrical section 28.

The elastomeric sealing element 26 includes a sealing lip 32 backed up by a garter spring 34, as is known in the art, and a dust lip 36 located on the axially opposite side of the inner flange 30 from the sealing lip 32. The elastomeric sealing element 26 also includes a layer 38 of material bonded to the O.D. of the cylindrical section 28 and to the axially inner end of the cylindrical section 28. The layer 38 includes a locking bead 42 and at least one, and preferably two or more sealing ribs 40, extending radially outwardly from the O.D. of the layer 38 (the dotted lines show the uncompressed shape of the ribs 40 prior to installation of the seal 10 in the bore 12). The sealing ribs are designed with respect to the I.D. of the bore 12 to provide a sufficient interference fit in the bore 12 to effect a seal, but insufficient to effect a "normal" press-fit that will retain the oil seal 10 in the bore 12.

In a preferred embodiment, the ribs 40 provide a nominal press-fit less than half of the normal press-fit required for rubber or elastomeric O.D. seals to retain an oil seal in a bore. In one example of a particular embodiment of the present invention, the O.D. of the sealing ribs 40 was 95.23/95.07 mm (3.749/3.743 inch) for a 95.054/95.000 mm (3.742/3.740 inch) bore given a nominal press-fit of 0.123 mm (0.005 inch). As will be recognized by those skilled in the art, this is less than one-half of the "normal" press-fit required for rubber (or elastomeric) O.D. seals of 0.279 MM (0.11 inch). While this reduced interference fit of the present invention is sufficient to effect a seal, it is not sufficient to retain the seal in the bore. For the purpose of positively retaining the oil seal 10 in the bore 12, the locking bead 42 is designed to snap into the locking groove 18. Also, as will be understood by those skilled in the art, the normal press-fit of known seals varies in proportion with the diameter of such seal, and the nominal press-fit of the seal of the present invention also varies in the same manner.

The locking bead 42 has a chamfered surface 44 between the O.D. and the axially inner radial face of the locking bead 42, to aid in inserting the oil seal 10 in the bore 12. Similarly, the bore is provided with a chamfered surface 43. In addition, the locking bead 42 has a locking shoulder 46 with an axially outer radial face substantially transverse to the seal axis for contacting the locking face 20 of the groove 18 for positively retaining the oil seal 10 in the bore 12. It is noted that the amount of radial force exerted against the bore 12 during seal installation can be predetermined by properly designing and adjusting the relationship between the axially inner end of the cylindrical section 28 and the locking bead 42. In a preferred embodiment, the axially inner end of the cylindrical section 28 is located at approximately the same axial position as is the locking shoulder 46. However, the relative position between the locking shoulder 46 and the axially end of the cylindrical section 28 can be at different axial positions. The more that the locking bead 42 is backed up by the metal shell, the higher are the radial forces involved during installation.

The invention has been described in detail with particular reference to the preferred embodiments thereof, but it will be understood that variations and modifications can be effected within the spirit and scope of the invention as described hereinabove and as defined in the appended claims.

What is claimed is:

1. In a method for positively retaining a seal in a housing bore in sealing contact with the bore, against which bore only a minimum of radially outwardly directed force may be exerted, the improvement comprising the steps of:
   a. providing an oil seal comprising an annular shell and an elastomeric sealing element bonded to the shell and having at least one annular O.D. sealing rib and also an annular locking bead extending axially inwardly beyond an axially inner end of the shell and having an O.D. greater than the O.D. of said at least one sealing rib, the locking bead having a locking shoulder for engaging a mating shoulder in a retaining groove in the I.D. of said bore,
   b. forming the O.D, of said at least one annular O.D. sealing rib so as to contact said bore with sufficient force to provide a fluid seal but with insufficient force to positively retain said seal in said bore, and
   c. controlling the force exerted on said bore by said locking bead during installation, said controlling step including locating the axially inner end of said shell at a predetermined position with respect to said locking bead to keep the outward force exerted on said bore by said locking bead during installation no greater than that exerted by said at least one O.D. sealing rib.

2. The method according to claim 1 wherein said controlling step comprises positioning said axially inner end of said shell at approximately the same axial position as that of said shoulder of said locking bead.

3. The method according to claim 1 wherein said controlling step further includes moving said locking bead, during installation, radially inwardly away from said bore at a position axially inwardly from the axially inner end of said shell.

4. In an oil seal to be installed in a housing bore against which only a minimum of radially outwardly directed force may be exerted, and comprising an annular shell and an elastomeric sealing element bonded to said shell and having at least one annular O.D. sealing rib and annular locking bead including a locking shoulder, said bead extending axially inwardly beyond an axially inner end of said shell, the improvement comprising means for controlling the force exerted on said bore by said locking bead during installation, said means including said shell being located for a predetermined length behind said locking bead.

5. The seal according to claim 4 wherein said axially inner end of said shell is located at approximately the same axial position as that of said shoulder of said locking bead.

* * * * *

UNITED STATES PATENT AND TRADEMARK OFFICE
CERTIFICATE OF CORRECTION

PATENT NO. : 4,026,563
DATED : May 31, 1977
INVENTOR(S) : Dean R. Bainard

It is certified that error appears in the above-identified patent and that said Letters Patent are hereby corrected as shown below:

Claim 4, line 6, after "and" insert --an--.

Signed and Sealed this

Tenth Day of November 1981

[SEAL]

Attest:

GERALD J. MOSSINGHOFF

Attesting Officer

Commissioner of Patents and Trademarks